US010579056B2

(12) United States Patent
Matsumura

(10) Patent No.: US 10,579,056 B2
(45) Date of Patent: Mar. 3, 2020

(54) CONTROL SYSTEM FOR VEHICLE

(71) Applicant: TOYOTA JIDOSHA KABUSHIKI KAISHA, Toyota-shi, Aichi-ken (JP)

(72) Inventor: Takeshi Matsumura, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 271 days.

(21) Appl. No.: 15/857,109

(22) Filed: Dec. 28, 2017

(65) Prior Publication Data
US 2018/0203444 A1 Jul. 19, 2018

(30) Foreign Application Priority Data

Jan. 17, 2017 (JP) ................................. 2017-006138

(51) Int. Cl.
*B60W 50/00* (2006.01)
*G05D 1/00* (2006.01)
*B62D 1/04* (2006.01)

(52) U.S. Cl.
CPC ........... *G05D 1/0061* (2013.01); *B60W 50/00* (2013.01); *B62D 1/046* (2013.01); *G05D 2201/0213* (2013.01)

(58) Field of Classification Search
CPC ........ G05D 1/0061; G05D 2201/0213; B60W 50/00; B60W 30/095; B60W 30/192;
(Continued)

(56) References Cited

U.S. PATENT DOCUMENTS 9,864,373 B2 * 1/2018 Otaki .................... B60W 50/08
10,067,506 B2 * 9/2018 Matsunaga ..... B60W 30/18163
(Continued)

FOREIGN PATENT DOCUMENTS

EP 2 979 914 A2 2/2016
JP 11-091397 A 4/1999
(Continued)

OTHER PUBLICATIONS

Mars et al., Analysis of Human-Machine Cooperation When Driving with Different Degrees of Haptic Shared Control, 2014, IEEE, p. 324-333 (Year: 2014).*
(Continued)

*Primary Examiner* — McDieunel Marc
(74) *Attorney, Agent, or Firm* — Sughrue Mion, PLLC

(57) ABSTRACT

An automated driving control part includes a judging part for judging if there is a request for preparatory action for manual driving, a judging part for judging if there is a request for override action to manual driving, a judging part for judging if the steering wheel gripping condition is a nongripping state, is a first or second gripping state based on driver input information to the steering wheel, and judging completion of the preparatory action and override action based on the steering wheel gripping state. The action completion judging part judges that the preparatory action has been completed when there is a preparatory action request and when it is judged that the state is the first or second gripping state and judges that the override action has been completed when there is an override action request and when it is judged that the state is the second gripping state.

7 Claims, 5 Drawing Sheets

(58) Field of Classification Search
CPC . B60W 50/08; B60W 30/18163; B62D 1/046; B60R 11/04
See application file for complete search history.

(56) References Cited

U.S. PATENT DOCUMENTS 10,120,378 B2* 11/2018 Matsushita ............. B60R 11/04
2016/0039428 A1   2/2016 Odate
2018/0113454 A1   4/2018 Emura et al.

FOREIGN PATENT DOCUMENTS

| | | |
|---|---|---|
| JP | 2016-038846 A | 3/2016 |
| JP | 2017-001563 A | 1/2017 |
| JP | 2017-007478 A | 1/2017 |

OTHER PUBLICATIONS

Griffiths et al., Shared control between human and machine: haptic display of automation during manual control of vehicle heading, 2004, IEEE, p. 1-9 (Year: 2004).*

Wada et al., Authority transfer method from automated to manual driving via haptic shared control, 2016, IEEE, p. 1-6 (Year: 2016).*

Langlois et al., Augmented reality versus classical HUD to take over from automated driving: An aid to smooth reactions and to anticipate maneuvers, 2016, IEEE, p. 1571-1578 (Year: 2016).*

* cited by examiner

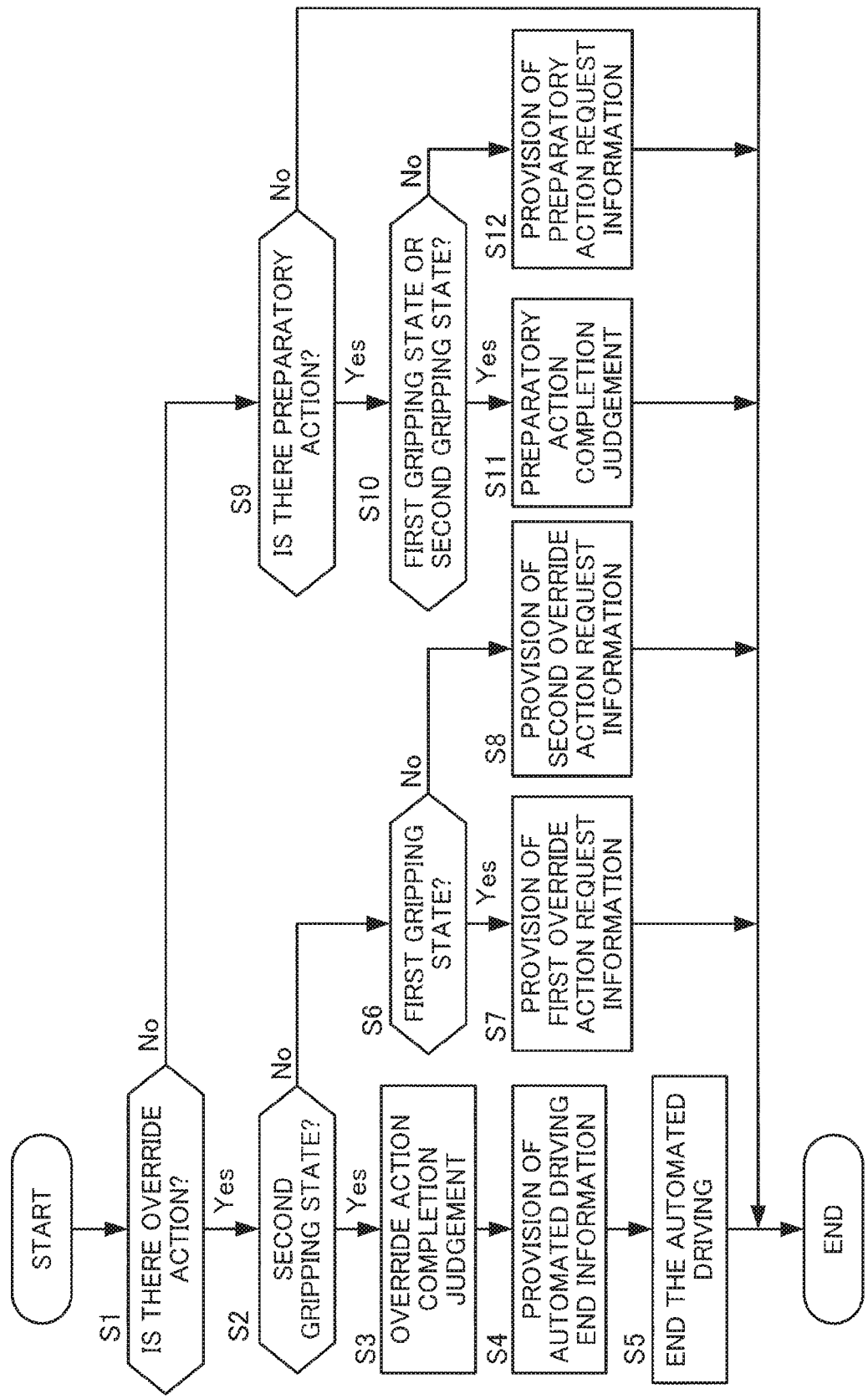

CONTROL SYSTEM FOR VEHICLE

CROSS-REFERENCE TO RELATED APPLICATION

This application claims priority based on Japanese Patent Application No. 2017-006138 filed with the Japan Patent Office on Jan. 17, 2017, the entire contents of which are incorporated into the present specification by reference.

TECHNICAL FIELD

The present disclosure relates to a control system for a vehicle.

BACKGROUND ART

JP2016-38846A discloses as a conventional control system for a vehicle configured to detect an area of a steering wheel touched by a hand of a driver during automated driving and to judge that there was an override action by the driver to manual driving (so-called "override") and switch from automated driving to manual driving when the area touched by a hand is a constant one or more.

SUMMARY

During automated driving, for example, there are scenarios such as when driving along a sharp curve, when the white line on the road has faded, and otherwise when the precision of automated driving falls although not to an extent for suspending automated driving. In such a scenario, the driver is preferably requested to take preparatory action for manual driving while automated driving is being continued as is, for example, is prompted to lightly place his hands on the steering wheel so as to be able to take over with manual driving immediately if something happens.

However, in the above-mentioned conventional control system of a vehicle, if the driver takes such preparatory action for manual driving, the system is liable to judge, contrary to the intent of the driver, that there was an override action for manual driving and end up switching from automated driving to manual driving in a state where the steering wheel is not being gripped.

The present disclosure was made focusing on such a problem and has as its object to keep automated driving from ending up being switched to manual driving in a state where the steering wheel is not being gripped.

To solve this problem, according to one aspect of the present disclosure, in a vehicle provided with a surrounding environment information acquiring device for acquiring surrounding environment information relating to a state of a surrounding environment of a host vehicle, a host vehicle information acquiring device for acquiring host vehicle information relating to a state of the host vehicle, and a driver information acquiring device for acquiring driver information relating to a state of the driver of the host vehicle, a control system for controlling the vehicle comprises an automated driving control part performing automated driving to automatically perform operations for driving a vehicle based on the surrounding environment information, host vehicle information, and driver information. The automated driving control part comprises a preparatory action request judging part for judging if there is a request to the driver for preparatory action for manual driving, an override action request judging part for judging if there is a request to the driver for override action to manual driving, a steering wheel gripping state judging part for judging if the steering wheel gripping state of the driver is a nongripping state, is a first gripping state including a state where the steering wheel is not gripped but a hand of the driver is touching the steering wheel, or is a second gripping state with a stronger degree of grip on the steering wheel than the first gripping state based on input information from the driver to the steering wheel of the vehicle included in the driver information, and an action completion judging part for judging completion of the preparatory action and override action based on the steering wheel gripping state. The action completion judging part is configured to judge that the preparatory action is completed if there is a request for preparatory action and it is judged that the steering wheel gripping state is the first gripping state or the second gripping state and to judge that the override action is completed if there is a request for override action and it is judged that the steering wheel gripping state is the second gripping state.

According to this aspect of the present disclosure, it is possible to keep automated driving from ending up being switched to manual driving in a state where the steering wheel is not being gripped.

BRIEF DESCRIPTION OF DRAWINGS

FIG. 6 is a flow chart for explaining automated driving control according to the present embodiment performed by an electronic control unit.

DESCRIPTION OF EMBODIMENTS

Figure 1:
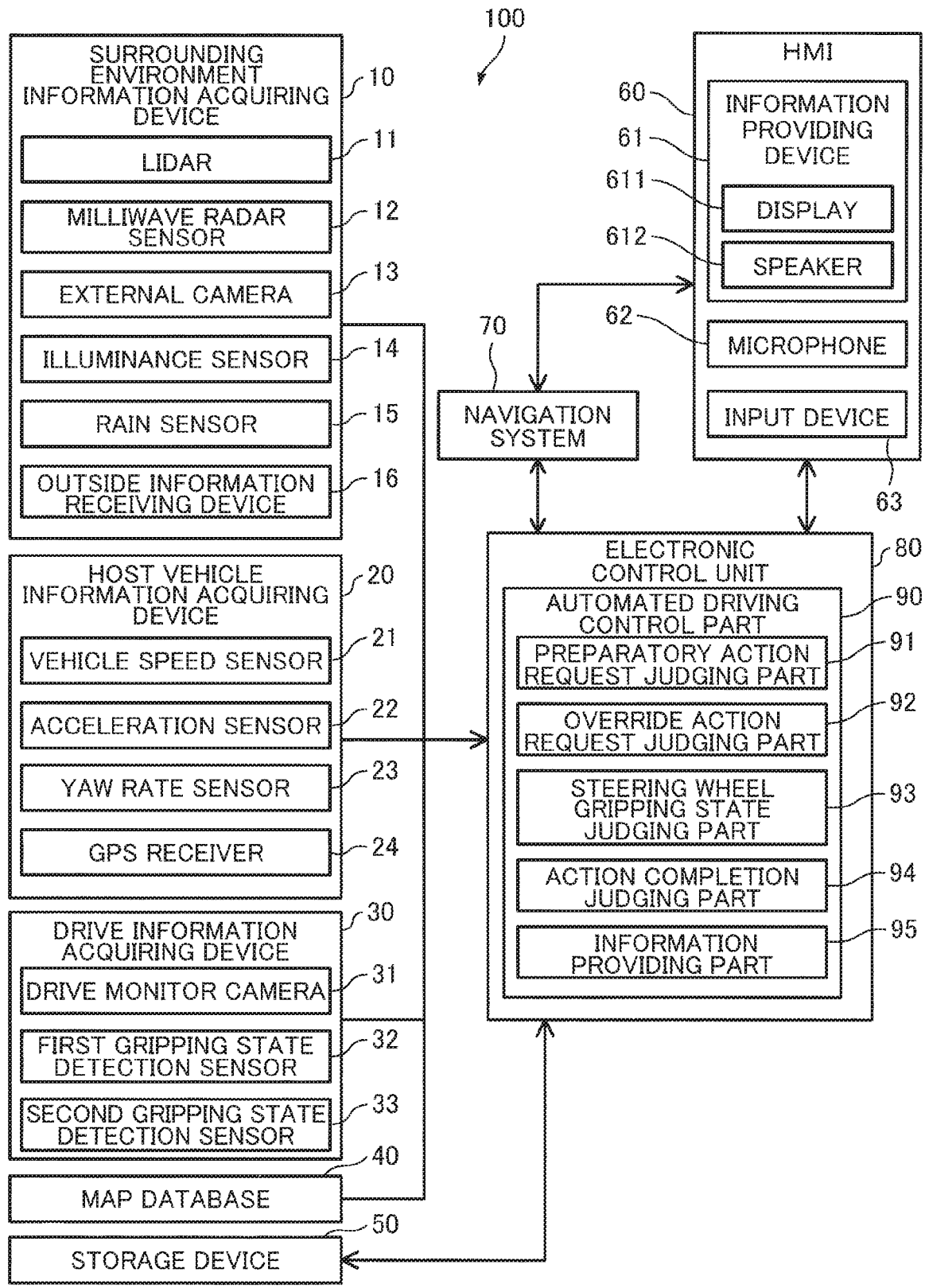
FIG. 1 is a schematic view of the configuration of an automated driving system for vehicular use according to one embodiment of the present disclosure.

Below, referring to the drawings, embodiments of the present invention will be explained in detail. Note that, in the following explanation, similar component elements will be assigned the same reference notations.

Figure 2:
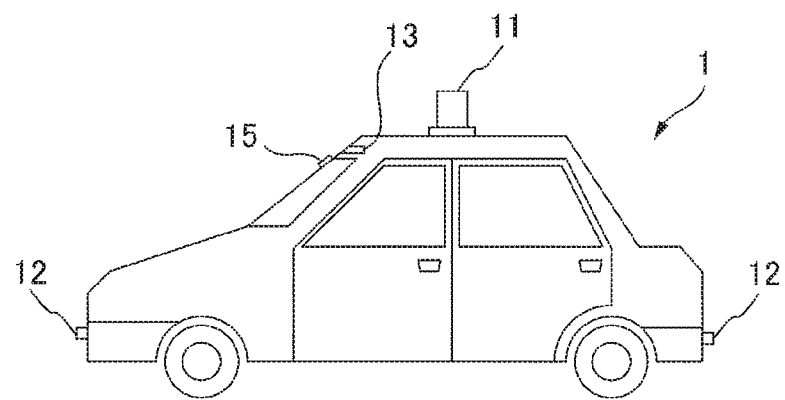
FIG. 2 is a schematic view of the appearance of a host vehicle mounting an automated driving system according to an embodiment of the present disclosure.
Figure 3:
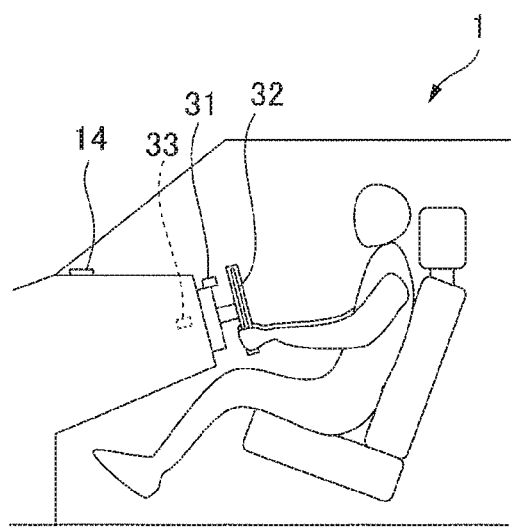
FIG. 3 is a schematic view of the inside of a host vehicle mounting an automated driving system according to an embodiment of the present disclosure.

FIG. 1 is a schematic view of the configuration of an automated driving system 100 of a vehicle according to one embodiment of the present invention. FIG. 2 is a schematic view of the appearance of a host vehicle 1 mounting the automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

Note that, the locations of attachment and number of the LIDARs 11 are not particularly limited so long as ones where the information necessary for generating a 3D image can be acquired. For example, they may also be attached to the grilles or to the insides of the headlights or brake lights and other such lights of the host vehicle 1 or may be attached divided among parts of the body (frame) of the host vehicle 1.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment and number of the milliwave radar sensors 12 are not particularly limited so long as ones where the necessary host vehicle surrounding information can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the location of attachment and number of the external cameras 13 are not particularly limited so long as ones able to capture an image of the area in front of the host vehicle 1. For example, a camera may also be attached to the top of the center part of the back surface of the front glass of the host vehicle.

The illuminance sensor 14 detects the illuminance in the host vehicle surroundings. As shown in FIG. 2, in the present embodiment, the illuminance sensor 14 is attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring device 30 is a device for acquiring information relating to the state of the driver of the host vehicle 1 (below, referred to as the "driver information"). As shown in FIG. 1 and FIG. 3, the driver information acquiring device 30 according to the present embodiment is provided with a driver monitor camera 31, a first gripping state detecting sensor 32, and a second gripping state detecting sensor 33.

The driver monitor camera 31 is attached to the top surface of the steering wheel column cover and captures an image of the appearance of the driver. The driver monitor camera 31 processes the captured image of the driver to detect information on the driver (direction of face of driver, degree of opening of eyes, etc.) and information on the appearance of the driver such as his posture. Further, the driver monitor camera 31 sends the detected information of the appearance of the driver to the electronic control unit 80.

The first gripping state detecting sensor 32 is a sensor for detecting input information from the driver to the steering wheel. Specifically, the first gripping state detecting sensor 32 detects as input information from the driver to the steering wheel whether the state of the driver gripping the steering wheel is a state where he has taken his hands off the steering wheel (below, referred to as the "nongripping state") or, for example, is a state where he is not gripping the steering wheel, but just placing his two hands on the steering wheel or other state in which at least the two hands of the driver are touching the steering wheel (below, referred to as the "first gripping state"). The first gripping state detecting sensor 32 sends the detected input information from the driver to the steering wheel, that is, information as to whether the steering wheel gripping state of the driver is the nongripping state or the first gripping state, to the electronic control unit 80.

In the present embodiment, as the first gripping state detecting sensor 32, an electrostatic capacity type touch sensor built into the steering wheel is used.

The second gripping state detecting sensor 33 is a sensor for detecting, as input information from the driver to the steering wheel, input information different from the input information detected by the first gripping state detecting sensor 32. Specifically, the second gripping state detecting sensor 33 detects, as input information from the driver to the steering wheel, whether the steering wheel gripping state of the driver is the nongripping state or, for example, is a state such as during manual driving where the driver is firmly gripping the steering wheel or other state where the degree by which the steering wheel is gripped is stronger than at least the first gripping state and where the driver is gripping the steering wheel to an extent enabling operation of the steering wheel (that is, steering) (below, referred to as the "second gripping state"). The second gripping state detecting sensor 33 sends the detected input information from the driver to the steering wheel, that is, information as to whether the steering wheel gripping state of the driver is the nongripping state or the second gripping state, to the electronic control unit 80.

In the present embodiment, as the second gripping state detecting sensor 33, a torque sensor built into a steering wheel column and outputting a voltage value corresponding to the left and right torque input to the steering wheel (below, referred to as the "steering torque") is used.

Below, referring to FIG. 4 and FIG. 5, how the second gripping state detecting sensor 33 comprised of a torque sensor is used to detect if the steering wheel gripping state is the nongripping state or the second gripping state will be briefly explained.

Figure 4:
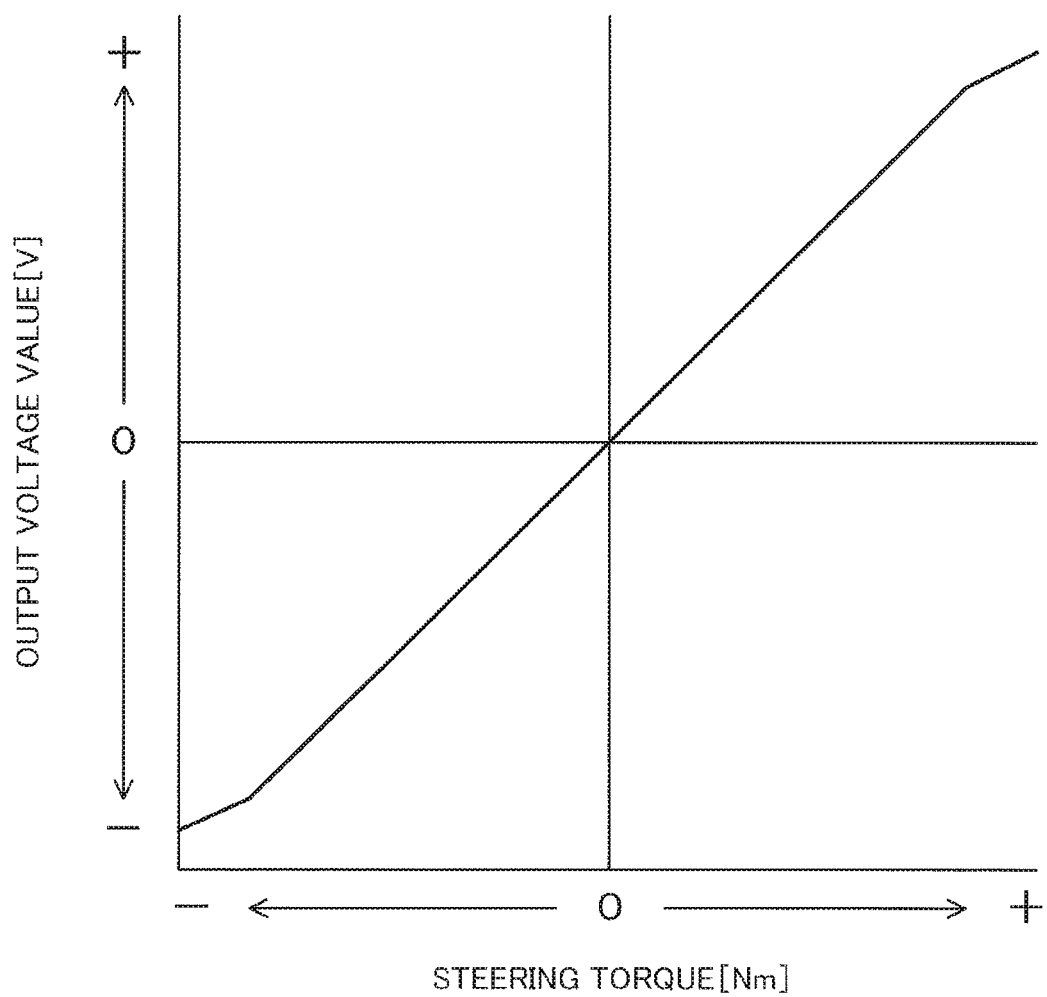
FIG. 4 is a view showing a relationship between a steering torque and a voltage value output from a second gripping state detecting sensor comprised of a torque sensor.

FIG. 4 is a view showing a relationship between a steering torque and a voltage value output from the second gripping state detecting sensor 33 comprised of a torque sensor (below, referred to as an "output voltage value").

As shown in FIG. 4, when the steering torque is zero, that is, when the steering wheel is not being turned to the right or left, the output voltage value also becomes zero. Further, as the steering wheel is turned to the right and the steering torque increases to the plus side, the output voltage value increases from zero. On the other hand, as the steering wheel is turned to the left and the steering torque increases to the minus side, the output voltage value decreases from zero.

Figure 5:
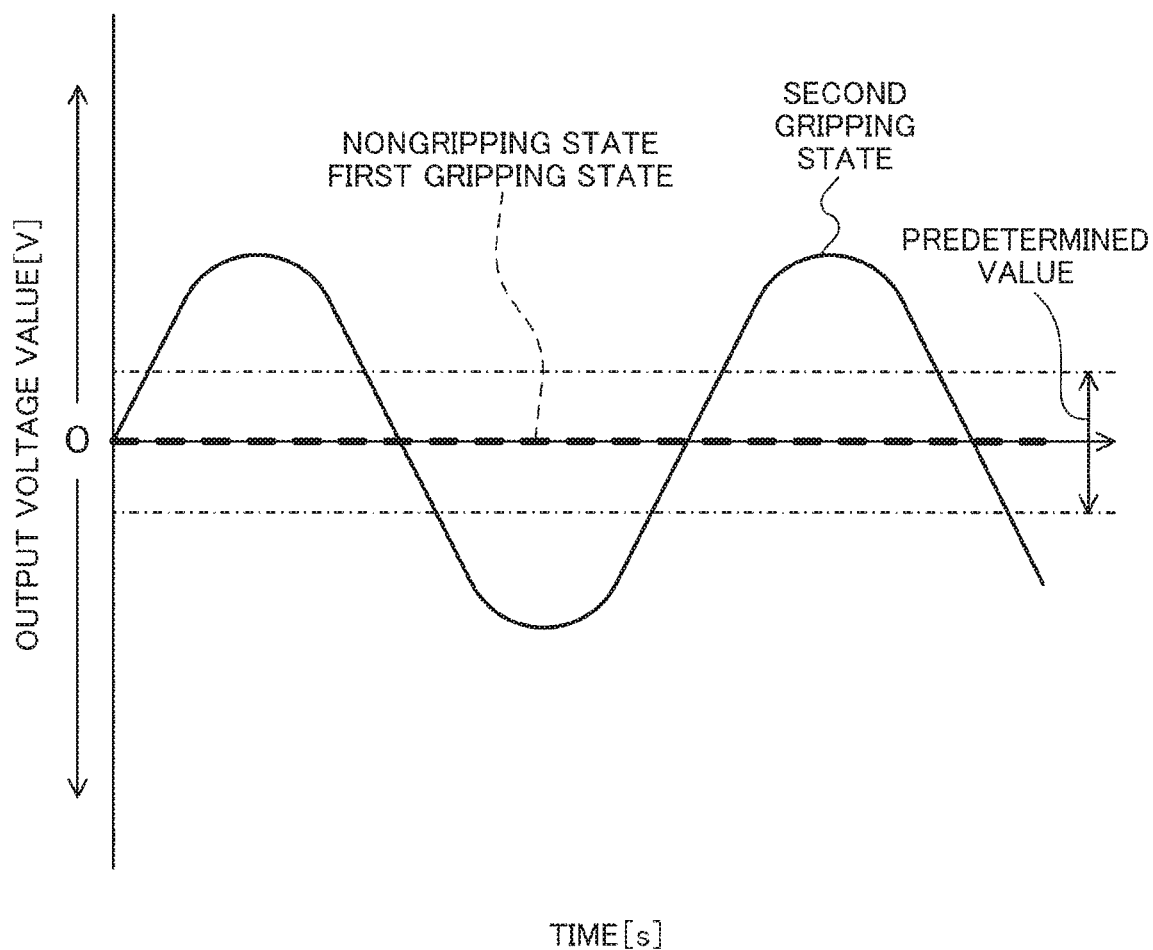
FIG. 5 is a view showing a state of change of an output voltage value in the case of using a second gripping state detecting sensor comprised of a torque sensor comparing the cases where the steering wheel gripping state is a nongripping state, first gripping state, and second gripping state.

FIG. 5 is a view showing the state of change of the output voltage value in the case of using a torque sensor as the second gripping state detecting sensor 33 comparing when the steering wheel gripping state is the nongripping state, the first gripping state, and the second gripping state.

When the steering wheel gripping state is the nongripping state and the first gripping state, the driver is not gripping the steering wheel, so basically no steering torque is generated. Therefore, as shown in FIG. 5, when the steering wheel gripping state is the nongripping state and the first gripping state, the output voltage value also basically becomes zero (or an extent slightly fluctuating).

On the other hand, when the steering wheel gripping state is the second gripping state, the driver is gripping the steering wheel, so even if driving the vehicle straight forward, the steering wheel is operated to the left and right to finely adjust the steering wheel to keep it at the center, so a steering torque is generated. Therefore, as shown in FIG. 5, when the steering wheel gripping state is the second gripping state, the output voltage value fluctuates. Therefore, in the present embodiment, the control system detects the amplitude of fluctuation of the output voltage value (height of output voltage value from peak value at minus side to peak value at plus side) and judges that the steering wheel gripping state is the second gripping state if the amplitude of fluctuation of the output voltage value is a predetermined value or more.

Returning to FIG. 1 to FIG. 3, the map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a passenger and the automated driving system 100. According to the present embodiment, the HMI 60 is comprised of an information providing device 61 for providing the driver with various types of information, a microphone 62 for picking up the voice of the driver, and a touch panel or operating buttons or other input device 63 for the driver to input information by and operate.

The information providing device 61 is provided with a display 611 for displaying text information or image information and a speaker 612 for generating sound.

The navigation system 70 is an apparatus for guiding the host vehicle 1 to a destination set by the driver through the HMI 60. The navigation system 70 uses the current position information of the host vehicle 1 detected by the GPS receiver 24 and map information of the map database 40 as the basis to calculate the target route to the destination and transmits the information of the calculated target route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 90 automatically performing driving operations relating to accelerating, steering, and braking when the driver switches from the manual driving mode (mode where driver performs driving operations relating to accelerating, steering, and braking) to the automated driving mode. The automated driving control part 90 controls the various control components necessary for driving operations relating to accelerating, steering, and braking and automatically drives the vehicle based on various types of information input to the electronic control unit 80 such as the surrounding environment information, host vehicle information, and driver information.

Here, during automated driving after switching to the automated driving mode, sometimes situations arise where continuation of automated driving would not be suitable. As an example of a situation where continuation of automated driving would not be suitable, for example, the case where it is judged that the LIDARs 11 or various sensors or cameras have broken down and surrounding environment information or host vehicle information and driver information can no longer be accurately detected, the case where it is judged that heavy rain or thick fog or glare etc. has resulted in the precision of detection of the surrounding environment information falling, the case where it is judged from driver appearance information detected by the driver monitor camera 31 that the driver has dozed off or has been distracted driving for a long period of time, etc. may be mentioned.

When in this way the situation arises where continuation of automated driving would not be suitable, for example, preferably the driver is prompted to firmly grip the steering wheel by his two hands so as to request the driver take override action to manual driving and manual driving is switched to after judging that the override action has been completed based on the steering wheel gripping state.

On the other hand, during automated driving after the automated driving mode is switched to, for example, there are scenarios such as when driving along a sharp curve, when the white line on the road has faded, when the road width is narrow, and otherwise when the precision of automated driving will fall although not to an extent for suspending automated driving. In such a scenario, the driver is preferably requested to take preparatory action for manual driving while automated driving is being continued as is, for example, is prompted to lightly place his hands on the steering wheel so as to be able to take over with manual driving immediately if something happens.

Further, when merging into a main lane or when changing lanes, when encountering congestion, when there is a fallen object ahead, etc., another surrounding vehicle or the fallen object etc. is liable to move suddenly in an unpredictable manner. Even in such a case, while not serious enough to suspend automated driving, it is preferable to request the driver take preparatory action for manual driving so that if something happens, danger can be avoided by judgment of the driver at that instant.

However, if, like the above-mentioned conventional control system of a vehicle, the area of the steering wheel touched by the hand is a certain area or more, it is judged that there was an override action to manual driving by the driver (so-called "override"). If automated driving is switched to manual driving, when the driver took such preparatory action for manual driving, it is liable to be judged, against the will of the driver, that there was an override action to manual driving and automated driving is liable to end up being switched to manual driving in the state where the steering wheel is not gripped.

Further, in the case of such a conventional control system of a vehicle, for example, even in a situation where the driver is not gripping the steering wheel but has two hands placed at the steering wheel, it is liable to be judged that there was an override action to manual driving and automated driving is liable to end up being switched to manual driving. In this way, if manual driving ends up being switched to in the state where the steering wheel is not firmed gripped, a time lag will occur until the driver actually performs a steering wheel operation. At the time of switching, the vehicle is liable to behave erratically or the driver is liable to be unable to take suitable action.

Therefore, in the present embodiment, the automated driving control part 90 is configured provided with the preparatory action request judging part 91, override action request judging part 92, steering wheel gripping state judging part 93, action completion judging part 94, and information providing part 95. Further, in judging completion of preparatory action for manual driving ("hands on") and completion of override action from automated driving to manual driving ("hand over") based on the steering wheel gripping state of the driver, it is made possible to make the conditions of the steering wheel gripping state for judging completion of preparatory action and the conditions of the steering wheel gripping state for judging completion of override action different. Below, this automated driving control according to the present embodiment will be explained.

FIG. 6 is a flow chart for explaining the automated driving control according to the present embodiment which the electronic control unit 80 performs. The electronic control unit 80 repeatedly performs this routine during the automated driving mode by a predetermined processing period.

At step S1, the electronic control unit 80 judges if it is necessary to request the driver to perform an override action to manual driving, that is, if there is a request to the driver to take override action to manual driving. The electronic control unit 80, as explained above, judges that there is a request to the driver to take override action to manual driving, for example, in the case where it is judged that the LIDARs 11 or various sensors or cameras have broken down and surrounding environment information or host vehicle information and driver information can no longer be accurately detected, the case where it is judged that heavy rain or thick fog or glare etc. has resulted in the precision of detection of surrounding environment information falling, the case where it is judged from driver appearance information detected by the driver monitor camera 31 that the driver has dozed off or has been distracted driving for a long period of time, etc. The electronic control unit 80 proceeds to the processing of step S2 if there is a request to the driver for override action to manual driving. On the other hand, the electronic control unit 80 proceeds to the processing of step S9 if there is no request to the driver for override action to manual driving.

At step S2, the electronic control unit 80 judges if the steering wheel gripping state is the second gripping state based on the input information from the driver to the steering wheel detected by the second gripping state detecting sensor 33. The electronic control unit 80 proceeds to the processing of step S3 if the steering wheel gripping state is the second gripping state. On the other hand, the electronic control unit 80 proceeds to the processing of step S6 if the steering wheel gripping state is not the second gripping state.

At step S3, the electronic control unit 80 judges that the override action from automated driving to manual driving has been completed. When, in this way, in the present embodiment, it is judged that there is an override action request, the unit judges that the override action has been completed only when the steering wheel gripping state is the second gripping state.

That is, in the present embodiment, if it is judged that there is an override action request, it is judged that the override action has been completed only when it is judged that the steering wheel gripping state is the second gripping state with the relatively strong degree of gripping the steering wheel. For this reason, it is possible to keep automated driving from ending up being switched to manual driving in a situation where the steering wheel is not being firmly gripped.

At step S4, the electronic control unit 80 provides a driver with information to the effect of ending automated driving (below, referred to as the "automated driving end information") through the information providing device 61. In the present embodiment, the electronic control unit 80 displays the text information "ENDING AUTOMATED DRIVING" on the display 611 and conveys the audio information "ENDING AUTOMATED DRIVING" by the speaker 612 to the driver. In this way, in the present embodiment, automated driving end information comprised of both text information and audio information is provided to the driver, but it is also possible to provide just either one of them. Further, the content of the text information and audio information is just one example.

At step S5, the electronic control unit 80 switches to the manual driving mode to end the automated driving.

At step S6, the electronic control unit 80 judges if the steering wheel gripping state is the first gripping state based on the input information from the driver to the steering wheel detected by the first gripping state detecting sensor 32. The electronic control unit 80 proceeds to the processing of step S7 if the steering wheel gripping state is the first gripping state. On the other hand, the electronic control unit 80 proceeds to the processing of step S8 if the steering wheel gripping state is not the first gripping state (that is, if it is the nongripping state).

At step S7, the electronic control unit 80 provides a driver having a steering wheel gripping state of the first gripping state with information to the effect of requesting override action (below, referred to as the "first override action request information") through the information providing device 61. In the present embodiment, the electronic control unit 80 displays the text information "PLEASE HOLD THE STEERING WHEEL MORE FIRMLY" on the display 611 and conveys the audio information "PLEASE HOLD THE STEERING WHEEL MORE FIRMLY" by the speaker 612 to the driver. In this way, in the present embodiment, first override action request information comprised of both text information and audio information is provided to the driver, but it is also possible to provide just either one of them. Further, the content of the text information and audio information is just one example.

At step S8, the electronic control unit 80 provides a driver having a steering wheel gripping state of a nongripping state with information to the effect of requesting override action (below, referred to as the "second override action request information") through the information providing device 61. In the present embodiment, the electronic control unit 80 displays the text information "PLEASE TAKE OVER DRIVING" on the display 611 and conveys the audio information "PLEASE TAKE OVER DRIVING" by the speaker 612 to the driver. In this way, in the present embodiment, second override action request information comprised of both text information and audio information is provided to the driver, but it is also possible to provide just either one of them. Further, the content of the text information and audio information is just one example.

At step S9, the electronic control unit 80 judges if it is necessary to request the driver take preparatory action for manual driving, that is, if there is a request to the driver to take preparatory action for manual driving. The electronic control unit 80 judges that there is a request to the driver to take preparatory action for manual driving when, for example, as mentioned before, judging the situation is one when driving along a sharp curve, when the white line on the road has faded, when the road width is narrow, and otherwise when the precision of automated driving is liable to fall from the surrounding environment information acquired by the surrounding environment information acquiring device 10. Further, the electronic control unit 80 judges there is a request to the driver to take preparatory action for manual driving, for example, when merging into the main lane, when changing lanes, when encountering congestion, and when it is judged there is a fallen object ahead from the surrounding environment information and host vehicle information and map information acquired by the host vehicle information acquiring device 20 in accordance with need. The electronic control unit 80 proceeds to the processing of step S10 if there is a request to the driver to take preparatory action for manual driving. On the other hand, the electronic control unit 80 ends the current processing if there is no request to the driver to take preparatory action for manual driving request.

At step S10, the electronic control unit 80 judges if the steering wheel gripping state is the first gripping state or the second gripping state based on the input information from the driver to the steering wheel detected by the first gripping state detecting sensor 32 and the second gripping state detecting sensor 33. The electronic control unit 80 proceeds to the processing of step S11 if the steering wheel gripping state is the first gripping state or the second gripping state. On the other hand, the electronic control unit 80 proceeds to the processing of step S12 if the steering wheel gripping state is the nongripping state.

At step S11, the electronic control unit 80 judges that the preparatory action for manual driving has been completed. In this way, in the present embodiment, if it is judged there is a preparatory action request, it is judged that the preparatory action has been completed if the steering wheel gripping state is the first gripping state or the second gripping state.

That is, in the present embodiment, if it is judged that there is a preparatory action request, it is judged that the preparatory action for manual driving has been completed even when it is judged that the state is the second gripping state with a relatively strong degree of gripping the steering wheel, so it is possible to keep automated driving from easily being switched to manual driving against the will of the driver regardless of it being a scenario in which automated driving can be continued. Further, when it becomes necessary to change over to manual driving, it is possible to quickly change the state of the driver from a preparatory action state to an override action state.

At step S12, the electronic control unit 80 provides the driver with information to the effect of requesting preparatory action (below, referred to as "preparatory action request information") through the information providing device 61. In the present embodiment, the electronic control unit 80 displays the text information "PLEASE PLACE BOTH HANDS ON THE STEERING WHEEL" on the display 611 and conveys the audio information "PLEASE PLACE BOTH HANDS ON THE STEERING WHEEL" by the speaker 612 to the driver. In this way, in the present embodiment, preparatory action request information comprised of both text information and audio information is provided to the driver, but it is also possible to provide just either one of them. Further, the content of the text information and audio information is just one example.

Note that, the preparatory action request judging part 91 corresponds to step S9 of the present flow chart. The override action request judging part 92 corresponds to step S1 of the present flow chart. The steering wheel gripping state judging part 93 corresponds to steps S2, S6, and S10 of the present flow chart. The action completion judging part 94 corresponds to steps S3 and S11 of the present flow chart.

According to the present embodiment explained above, in a vehicle provided with a surrounding environment information acquiring device 10 for acquiring surrounding environment information relating to the state of the surrounding environment of the host vehicle, a host vehicle information acquiring device 20 for acquiring host vehicle information relating to the state of the host vehicle, and a driver information acquiring device 30 for acquiring driver information relating to the state of the driver of the host vehicle, the electronic control unit 80 (control system) for controlling the vehicle is provided with an automated driving control part 90 performing automated driving to automatically perform operations for driving the vehicle based on the surrounding environment information, host vehicle information, and driver information. The automated driving control part 90 comprises a preparatory action request judging part 91 for judging if there is a request to the driver for preparatory action for manual driving, an override action request judging part 92 for judging if there is a request to the driver for override action to manual driving, a steering wheel gripping state judging part 93 for judging if the steering wheel gripping state of the driver is a nongripping state, is a first gripping state including a state where the steering wheel is not gripped but a hand of the driver is touching the steering wheel, or is a second gripping state with a stronger degree of gripping the steering wheel than the first gripping state based on input information from the driver to the steering wheel of the vehicle included in the driver information, and an action completion judging part 94 for judging completion of the preparatory action and override action based on the steering wheel gripping state.

Further, the action completion judging part 94 is configured to judge that the preparatory action has been completed when there is a preparatory action request and it is judged that the steering wheel gripping state is the first gripping state or the second gripping state and to judge that the override action has been completed when there is an override action request and it is judged that the steering wheel gripping state is the second gripping state.

In this way, according to the present embodiment, it is judged that the preparatory action has been completed when there is a preparatory action request even when it is judged that the state is the second gripping state with the relatively strong degree of gripping the steering wheel. For this reason, it is possible to keep automated driving from easily being switched to manual driving against the will of the driver regardless of it being a scenario in which automated driving can be continued. As a result, it is possible to keep automated driving from ending up being switched to manual driving in a situation in which the steering wheel is not being firmly gripped. Further, when it becomes necessary to change over to manual driving, it is possible to quickly change the state of the driver from a preparatory action state to an override action state.

Further, it is judged that the override action has been completed when there is an override action request only when it is judged that the steering wheel gripping state is the second gripping state with the relatively strong degree of gripping the steering wheel. For this reason, it is possible to keep automated driving from ending up being switched to manual driving in the state where the steering wheel is not being firmly gripped.

Further, the vehicle according to the present embodiment is provided with an information providing device 61 for providing the driver of the host vehicle 1 with information. The automated driving control part 90 is further provided with an information providing part 95 providing the driver with preparatory action request information for requesting preparatory action through the information providing device 61 based on the steering wheel gripping state when there is a preparatory action request.

Due to this, the driver can be provided with suitable preparatory action request information corresponding to the steering wheel gripping state.

In particular, in the present embodiment, the information providing part 95 is configured to provide the driver with preparatory action request information only when it is judged that the steering wheel gripping state is the nongripping state.

Due to this, when the preparatory action has not been completed, that is, when the steering wheel gripping state is the nongripping state, the driver is provided with preparatory action request information, so the driver can be reliably requested to take preparatory action. On the other hand, when the preparatory action has already been completed, that is, when the steering wheel gripping state is the first gripping state or the second gripping state, preparatory action request information is not provided, so it is possible to eliminate the trouble of preparatory action request information being provided despite the preparatory action being completed.

Further, in the present embodiment, the information providing part 95 is configured to provide the driver with override action request information for requesting the driver take override action through the information providing device 61 based on the steering wheel gripping state when there is an override action request.

Due to this, the driver can be provided with suitable override action request information corresponding to the steering wheel gripping state.

In particular, in the present embodiment, the information providing part 95 is configured to provide the driver with override action request information only when it is judged that the steering wheel gripping state is the nongripping state or the first gripping state.

Due to this, when the override action is not completed, that is, when the steering wheel gripping state is the nongripping state or the first gripping state, the driver is provided with override action request information, so the driver can be reliably requested to take override action. On the other hand, when the override action has already been completed, that is, when the steering wheel gripping state is the second gripping state, override action request information is not provided, so it is possible to eliminate the trouble of override action request information being provided despite the override action being completed.

Further, in the present embodiment, the information providing part 95 is configured to change the content of override action request information between when it is judged that the steering wheel gripping state is the nongripping state and when it is judged it is the first gripping state.

Due to this, the driver can be provided with much more suitable override action request information corresponding to the steering wheel gripping state.

Further, in the present embodiment, the information providing part 95 is configured so that when there is an override action request and it is judged that the steering wheel gripping state is the second gripping state, the driver is further provided with automated driving end information indicating to end automated driving.

Due to this, the driver may be made to reliably recognize the end of automated driving.

Above, embodiments of the present disclosure were explained, but the embodiments only show part of the examples of application of the present disclosure and are not meant to limit the technical scope of the present disclosure to the specific constitutions of the embodiments.

In the above embodiments, the state of the two hands of the driver touching the steering wheel was defined as "the first gripping state", but the state of at least one hand of the driver touching the steering wheel may also be defined as "the first gripping state".

Further, in the above embodiments, a touch sensor was mentioned as a specific example of the first gripping state detecting sensor 32, while a torque sensor was mentioned as a specific example of the second gripping state detecting sensor 33, but the disclosure is not limited to these. Further, if the non-gripping state, the first gripping state, and the second gripping state can be discriminated, two sensors 32 and 33 are not necessarily required. For example, one or both of the first gripping state detecting sensor 32 and the second gripping state detecting sensor 33 may also be replaced with a pressure sensor detecting a degree of grip on a steering wheel etc. Further, the first gripping state detecting sensor 32 or the second gripping state detecting sensor 33 may be replaced with one camera etc. and the steering wheel gripping state detected from the outer appearance information of the driver detected by the camera etc.

The invention claimed is:

1. A control system for a vehicle configured to control a vehicle, which vehicle provided with:
   a surrounding environment information acquiring device configured so as to acquire surrounding environment information relating to a state of a surrounding environment of a host vehicle;
   a host vehicle information acquiring device configured so as to acquire host vehicle information relating to a state of the host vehicle; and
   a driver information acquiring device configured to acquire driver information relating to a state of the driver of the host vehicle,
   the control system for a vehicle comprising an automated driving control part configured so as to perform automated driving to automatically perform operations for driving the vehicle based on the surrounding environment information, host vehicle information, and driver information,
   the automated driving control part comprising:
   a preparatory action request judging part configured so as to judge if there is a request to the driver to take preparatory action for manual driving;
   an override action request judging part configured so as to judge if there is a request to the driver to take override action to manual driving;
   a steering wheel gripping state judging part configured so as to judge if the steering wheel gripping state of the driver is a nongripping state, is a first gripping state including a state where the steering wheel is not gripped but a hand of the driver is touching the steering wheel, or is a second gripping state with a stronger degree of gripping the steering wheel than the first gripping state based on input information from the driver to the steering wheel of the vehicle included in the driver information; and
   an action completion judging part configured so as to judge completion of the preparatory action and override action based on the steering wheel gripping state,
   the action completion judging part further configured:
   to judge that the preparatory action is completed if there is a request for preparatory action when it is judged that the steering wheel gripping state is the first gripping state or the second gripping state; and
   to judge that the override action is completed if there is a request for override action when it is judged that the steering wheel gripping state is the second gripping state.

2. The control system for a vehicle according to claim 1, wherein
   the vehicle is provided with an information providing device configured so as to provide the driver of the host vehicle with information, and
   the automated driving control part further comprises an information providing part configured so as to provide the driver with preparatory action request information for requesting the preparatory action through the information providing device based on the steering wheel gripping state when there is a preparatory action request.

3. The control system for a vehicle according to claim 2, wherein
   the information providing part is configured so as to provide the driver with the preparatory action request information only when it is judged that the steering wheel gripping state is the nongripping state.

4. The control system for a vehicle according to claim 1, wherein
   the vehicle is provided with an information providing device configured so as to provide the driver of the host vehicle with information, and
   the automated driving control part further comprises an information providing part configured so as to provide the driver with override action request information for requesting override action through the information providing device based on the steering wheel gripping state when there is an override action request.

5. The control system for a vehicle according to claim 4, wherein
the information providing part is configured so as to provide the driver with the override action request information only when it is judged that the steering wheel gripping state is the nongripping state or the first gripping state.

6. The control system for a vehicle according to claim 5, wherein
the information providing part is configured so as to change the content of the override action request information between when it is judged that the steering wheel gripping state is the nongripping state and when it is judged that it is the first gripping state.

7. The control system for a vehicle according to claim 4, wherein
the information providing part is configured to further provide the driver with automated driving end information to the effect of ending automated driving when there is a request for override action when it is judged that the steering wheel gripping state is the second gripping state.

* * * * *